UNITED STATES PATENT OFFICE.

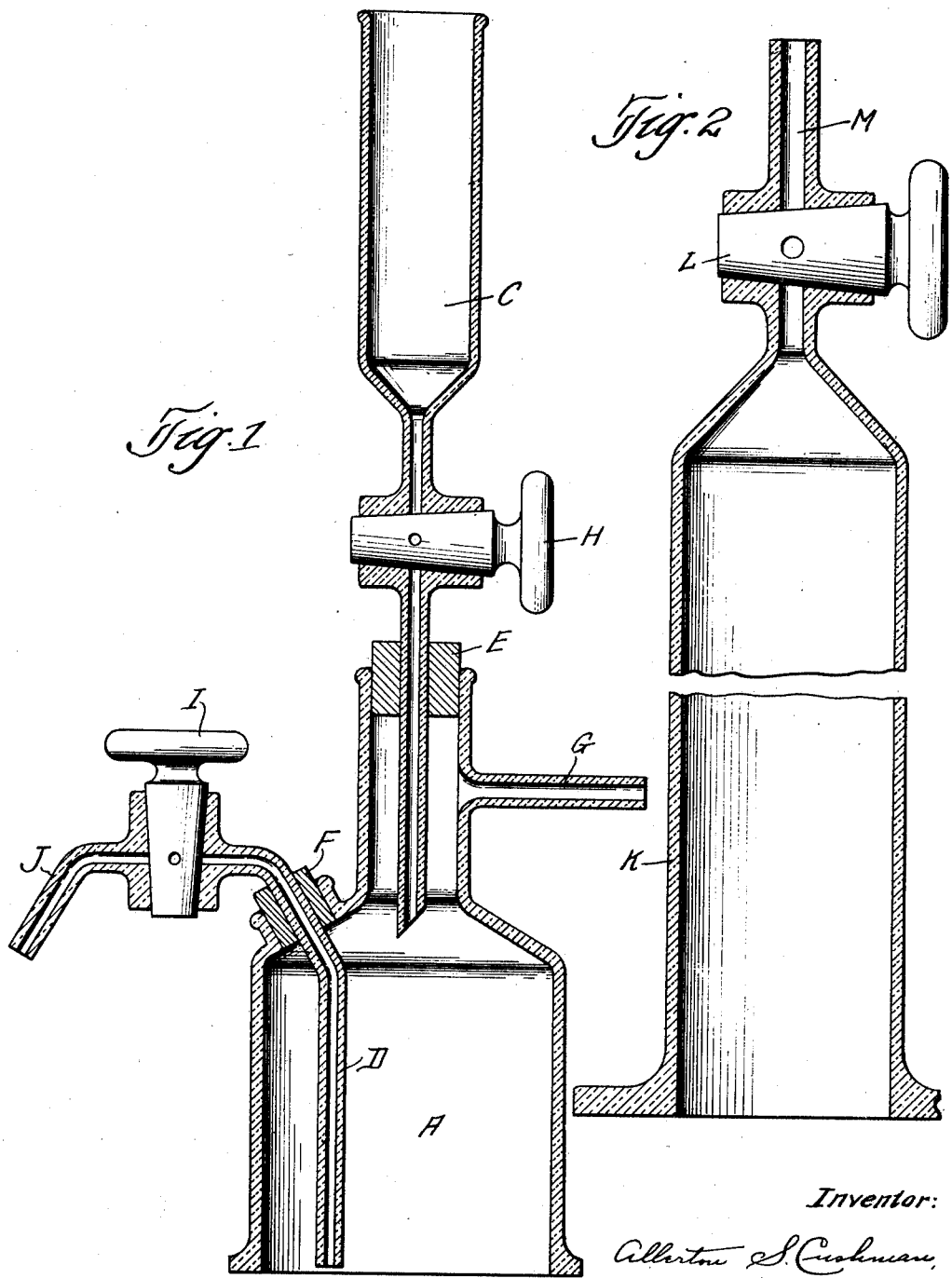

ALLERTON S. CUSHMAN, OF WASHINGTON, DISTRICT OF COLUMBIA.

METAL-COATINGS TESTER.

1,372,405.  Specification of Letters Patent.  Patented Mar. 22, 1921.

Application filed February 6, 1920. Serial No. 356,683.

*To all whom it may concern:*

Be it known that I, ALLERTON S. CUSHMAN, a citizen of the United States, residing at Washington, in the District of Columbia, have invented certain new and useful Improvements in Metal-Coatings Testers, of which the following is a specification.

It has been customary in order to determine the weight of protective metallic coatings on iron and steel sheet, wire or other articles of manufacture made on an iron or steel base, to cut specimens of specified dimensions, and dissolve off the coating in hydrochloric acid in which a certain quantity of chlorid of antimony is dissolved. The object of the chlorid of antimony is to prevent the acid from attacking the iron or steel base after it has dissolved off the metallic coating such as may be represented by zinc, tin, or terne composition. There is nothing new or novel in the use of antimony chlorid for this purpose. I confine myself in my claims for invention to the apparatus which I have designed with the following object.

By my method it is not necessary to cut specimens of accurate dimension or length from the coated metal under investigation, and thereafter go to the expense of time and money in accurately measuring or machining the specimen to a specified length or area. The object of my invention is to provide a glass apparatus as illustrated, which can be placed upon the surface of coated sheet metal at any desired spot, and by letting in the acid onto the spot, strip the zinc coating, collect the hydrogen gas evolved by the reaction in a tube so suitably graduated that the volume of hydrogen measured will accurately measure the weight of protective coating in ounces per square foot or in any other desired system of prescribing the weight per unit surface.

I now refer to the attached sketch of my apparatus which is constructed entirely of glass except for the rubber stoppers shown on the sketch at E and F. A is a glass vessel provided with flanges at the base B, accurately ground so as to be flat and true. By smearing the flange at B with a thin film of desiccator grease, it can be placed on the surface of coated sheet metal and pressed down so that the joint at B is pneumatically sealed to a slight head of liquid contained in the vessel A. Having first sealed the apparatus to the surface as described, a known quantity of hydrocholric acid (1.20 sp. gr.) containing a small quantity of antimony chlorid in solution is placed in the thistle tube C. In the meantime, the delivery tube G may be connected with a piece of rubber tubing terminating in a glass elbow delivery tube. The glass elbow delivery tube is inserted under the bottom of the graduated collection tube K which is set on a stand in a basin of water. The tube K is entirely filled with water by suction through the tube M which is connected with K by the stopcock L. When all is ready, the stopcock I being closed, cock H is opened, which allows the acid in C to completely run into the vessel A. Stopcock H is immediately closed. In about two minutes the metallic coating is stripped from the spot covered on the sheet by the flange B, and the hydrogen gas passed over into the collection tube K where its volume is read off and recorded. The glass elbow delivery tube is then removed and stopcock I opened. By blowing through tube G and opening stopcock I, the exhausted acid is blown out of A, passing out of tube J into a suitable glass vessel. Fresh water is then let down through C and H to rinse the remaining acid out of A and the rinsing water again blown out at J. The apparatus can then be lifted to a new spot, if it is desired to explore the weight of coating on different parts of the same sheet.

If the apparatus is to be used for determining the weight of coating on say galvanized wire, a definite length of wire of known gage is cut into pieces of suitable length, and placed underneath the apparatus in vessel A. In this case, however, a ground glass base is used instead of the sheet metal as hereinbefore described. In the same way, coated iron and steel objects of suitable size can be placed in A when it is desired to determine the weight of coating which they carry.

By use of this apparatus, I am enabled to determine the weight of coating on any desired surface in a very few minutes, thus avoiding the costly and time consuming process of preparing specimens by cutting out sections from surfaces of heavy sheet metals, and thereafter having them accurately machined to known specific areas. I can also explore the weight of coating on all parts of both sides of full size commercial sheets of all gages, without cutting or destroying the sheets, as happens in the usual method of testing, so that full size commercial sheets after having been tested with my apparatus can be re-pickled and re-run at the factory without wasting or cutting out or otherwise injuring the sheet. By my method I can fully explore the weight of coating on a sheet in a few minutes, whereas heretofore many hours of machine shop work have had to be done in testing sheet metals before the chemical stripping and weighing can be made. I have carefully calibrated my apparatus and find that it gives readings of a greater degree of accuracy than the more tedious process of cutting, stripping and weighing.

I wish to have it understood that the foregoing disclosure has been made solely for the purpose of explaining the nature of the invention and the principles upon which it is based. I have referred, for the sake of convenience, to the application of a form of my invention to a plane surface. I am, however, in no wise limited thereto. The invention is applicable to any surface, whatever its character may be. It is merely necessary to employ a vessel corresponding to vessel A which has its open end shaped to fit the contour of the surface to be tested. For instance, in order to explore the surface of an already formed corrugated surface I would use a convoluted templet designed to fit the corrugations and to which the vessel A is made to adhere. This templet may be fashioned out of hard rubber or out of glass or any other suitable material properly formed and ground to fit the standard size corrugations generally used. For field use it is even desirable to make the templet of iron or other metals to decrease the danger of breaking. The action of the acid upon the coating is so rapid in comparison with its action upon various other metals and the test period so short that these metals may be used with safety. It is not necessary to go into detail as to the various details of adapting the vessel A to surfaces of various forms as this is a matter of common knowledge and does not affect the essence of my invention.

While I have shown a particular arrangement for making communicating connections to the vessel A, it is understood that these connections may be made in various other ways within the scope of the invention. The vessel A might for instance be closed at the top by a stopper with three holes to permit the insertion of tubes corresponding to C, D and G.

While I have specifically referred to one way of providing a seal between the vessel A and the surface of the element to be tested, the invention is by no means identified therewith. It is obvious that a seal may be provided in various other ways.

I claim:

1. The process of determining the weight of metallic coatings on iron and steel structures, which consists in applying hydrochloric acid to a definite integral portion of the coated surface of the structure and measuring the volume of gas evolved by the action of the acid.

2. Apparatus for determining the weight of metallic coatings of iron and steel structures *in situ*, comprising a receptacle open at its bottom, means at its top for introducing a liquid and means for drawing off gas evolved therein.

3. Apparatus for determining the weight of metallic coatings of iron and steel structures *in situ*, comprising a receptacle open at its bottom and having at its top a stopper opening adapted to receive a thistle tube and an outlet for gas evolved in the receptacle.

4. Apparatus for determining the weight of metallic coatings of iron and steel structures *in situ*, comprising a receptacle having an open bottom, a stopper opening at its top and an outlet for gas evolved in the receptacle, and a thistle tube adapted to be inserted into said stopper opening.

In testimony whereof I affix my signature.

ALLERTON S. CUSHMAN.